US011468275B1

(12) United States Patent
Blechschmidt et al.

(10) Patent No.: US 11,468,275 B1
(45) Date of Patent: Oct. 11, 2022

(54) COMPUTER VISION USING A PRIOR PROBABILITY DISTRIBUTION SELECTED BASED ON AN IMAGE CAPTURE CONDITION

(71) Applicant: Apple Inc., Cupertino, CA (US)

(72) Inventors: Angela Blechschmidt, San Jose, CA (US); Daniel Ulbricht, Sunnyvale, CA (US); Mohammad Haris Baig, San Jose, CA (US)

(73) Assignee: Apple Inc., Cupertino, CA (US)

( * ) Notice: Subject to any disclaimer, the term of this patent is extended or adjusted under 35 U.S.C. 154(b) by 337 days.

(21) Appl. No.: 16/744,425

(22) Filed: Jan. 16, 2020

Related U.S. Application Data

(60) Provisional application No. 62/813,789, filed on Mar. 5, 2019.

(51) Int. Cl.
| | |
|---|---|
| *G06K 9/62* | (2022.01) |
| *G06N 20/00* | (2019.01) |
| *G06V 10/20* | (2022.01) |
| *G06N 3/08* | (2006.01) |

(52) U.S. Cl.
CPC ........... *G06K 9/6277* (2013.01); *G06N 20/00* (2019.01); *G06V 10/20* (2022.01); *G06N 3/08* (2013.01)

(58) Field of Classification Search
CPC .......... G06N 20/00; G06N 7/005; G06N 3/08; G06N 5/02; G06N 3/02; G06N 5/048; G06K 9/6278; G06K 9/6277; G06K 9/6297; G06K 9/6288; G06K 9/6296; G06V 10/82; G06V 40/1388; G06V 10/20
See application file for complete search history.

(56) References Cited

U.S. PATENT DOCUMENTS

| | | | |
|---|---|---|---|
| 8,644,563 B2 | 2/2014 | Akbarzadeh et al. | |
| 8,971,612 B2 * | 3/2015 | Shotton | G06K 9/6282 382/159 |
| 2009/0290750 A1 * | 11/2009 | Tapson | H04N 21/23892 382/100 |

(Continued)

OTHER PUBLICATIONS

IP.com IP.com No. IPCOM000252090D Using Image Recognition to Control Devices—2017 (Year: 2017).*

(Continued)

*Primary Examiner* — Nizar N Sivji
(74) *Attorney, Agent, or Firm* — Thompson Hine LLP

(57) ABSTRACT

A machine learning (ML) model is trained and used to produce a probability distribution associated with a computer vision task. The ML model uses a prior probability distribution associated with a particular image capture condition determined based on sensor data. For example, given that an image was captured by an image capture device at a particular height above the floor and angle relative to the vertical world axis, a prior probability distribution for that particular image capture device condition can be used in performing a computer vision task on the image. Accordingly, the machine learning model is given the image as input as well as the prior probability distribution for the particular image capture device condition. The use of the prior probability distribution can improve the accuracy, efficiency, or effectiveness of the ML learning model for the computer vison task.

15 Claims, 6 Drawing Sheets

(56) References Cited

U.S. PATENT DOCUMENTS

| | | | |
|---|---|---|---|
| 2016/0125272 A1* | 5/2016 | Schneiderman | G06K 9/6282 |
| | | | 382/228 |
| 2016/0171717 A1* | 6/2016 | Hasegawa | H04N 7/181 |
| | | | 348/159 |
| 2017/0076438 A1 | 3/2017 | Kottenstette et al. | |
| 2018/0005079 A1* | 1/2018 | Tosic | G06V 10/82 |
| 2018/0376108 A1* | 12/2018 | Bright-Thomas | G06K 9/6274 |
| 2019/0026917 A1* | 1/2019 | Liao | G06T 7/60 |
| 2022/0039357 A1* | 2/2022 | Roth | A01K 29/005 |

OTHER PUBLICATIONS

Information and Perception of Meaningful Patterns—2013 (Year: 2013).*

Information Theoretic Sensor Data Selection for Active Object Recognition and State Estimation—2002 (Year: 2002).*

Implementation of a Bayesian Self-organizing Neural Network—1994 (Year: 1994).*

\* cited by examiner

COMPUTER VISION USING A PRIOR PROBABILITY DISTRIBUTION SELECTED BASED ON AN IMAGE CAPTURE CONDITION

CROSS-REFERENCE TO RELATED APPLICATIONS

This Applications claims the benefit of U.S. Provisional Application Ser. No. 62/813,789 filed Mar. 5, 2019, which is incorporated herein in its entirety.

TECHNICAL FIELD

The present disclosure generally relates to computer vision, and in particular, to systems, methods, and devices for implementing machine learning/prediction computer vision techniques using sensor data.

BACKGROUND

Like human vision, computer vision tasks generally attempt to reason from one or more images. Humans, however, frequently have the benefit of at least some background knowledge or expectations that are useful to such reasoning. For example, humans often have implicit notions of where certain types of things might be in the areas around them. As a specific example, a human, even with eyes closed, may have a notion that a table is more likely to be ahead of him than above him on the ceiling. Computer vision tasks, in contrast, generally attempt to reason from images without the benefit of such background knowledge and expectations and thus can be less accurate, efficient, or effective than desired.

SUMMARY

In some implementations, a machine learning model is trained and used to produce a probability distribution associated with a computer vision task. The ML model uses a prior probability distribution associated with a particular image capture condition determined based on sensor data. A "prior probability distribution," or simply "prior," of an uncertain quantity refers to the probability distribution of expectations about this quantity before some evidence is taken into account. For example, a prior probability distribution may express the probabilities that each pixel of an image that is not yet analyzed will correspond to a particular object (e.g., a table). Some implementations use priors that are specific to a particular image capture condition associated with an image to be analyzed. For example, given that an image was captured by an image capture device at a particular height above the floor and angle relative to the vertical world axis, a prior for that particular image capture device condition can be used in performing a computer vision task on the image. Thus, when analyzing an image from an image capture device that was aimed up at the ceiling, the computer vision task can use a prior that reflects a low expectation of finding a table at some or all of the pixels in the image. In some implementations, the prior probability distribution is "blind," meaning that the prior can be used in an entirely new scene and does not necessarily reflect information about the scene, e.g., the prior can still provide a low expectation of finding a table at some or all of the pixels in an image even though it is the first image captured in a room, venue, or other scene.

Some implementations disclosed herein provide a method performed at an electronic device having a processor. The method involves obtaining an image of a physical setting from an image capture device and obtaining an image capture condition of the physical setting from a sensor. For example, sensor data from the sensor can be used to determine image capture conditions such as image capture device height, image capture device angle, geographic location, time, etc. The method further involves identifying a prior probability distribution for use with a machine learning (ML) model that produces probability distribution outputs associated with a computer vision task. This prior probability distribution is identified based on the image capture condition of the image. The computer vision task can include, but is not limited to, semantic segmentation, normal direction estimation, depth estimation, image-to-image translation, etc. For semantic segmentation, for example, the prior may be a vector denoting probabilities that particular classes (e.g., chairs, tables, clocks, flowers, trees, walls, etc.) of a set of predefined classes are present in each portion/pixel of an image given the particular image capture condition. For normal direction estimation, the prior may be a vector denoting probabilities of surface normal values for each image portion/pixel given the image capture condition. For depth estimation, the prior may be a vector denoting probabilities of depth values for each image portion/pixel given the image capture condition.

The method further involves producing a probability distribution output associated with the computer vision task using the ML model on the image and using the prior probability distribution associated with the image. For semantic segmentation, for example, the ML model may produce an output image that includes a probability distribution that predicts the likelihood that each pixel of the input image is a chair, table, wall, ceiling, etc., taking into account a prior probability distribution associated with the image capture device's current height and angle.

After producing a probability distribution output for the image, the method can use this information to update the prior. For example, after determining that the image does include a chair, the associated prior probability distribution for that particular image condition (e.g., height and angle of the image capture device) can be updated to reflect this new information.

In some implementations, prior probability distributions are learned using synthetic data, e.g., labelled virtual content in virtual rooms, rather than manually labelled images of real world rooms. Such a training technique can reduce the amount of manual labeling that would otherwise be required. For example, a user may simply create a virtual room with specified virtual objects (e.g., chairs, walls, etc.) that is used to automatically generate many images from many virtual image capture conditions. This automatic labelled image generation maybe far easier than manually labelling each portion/pixel of each image of a real world scene.

Some implementations disclosed herein provide a method performed at an electronic device having a processor. The method generates a three-dimensional (3D) scene of virtual objects. The virtual objects can be automatically or manually labelled with the particular classes (e.g., chairs, tables, walls, etc.) of a set of predefined classes. The positions of the virtual objects can also be known. The method creates images of the 3D scene captured by a virtual image capture device in multiple virtual image capture conditions. For example, this can involve capturing images of the scene from multiple, different virtual image capture device heights and angles. The images can be captured from different positions in the scene. In some implementations, the images are collected from multiple labelled 3D scenes of virtual objects (e.g., a virtual family room, a virtual office, a virtual bedroom, etc.). The method generates a prior probability distribution for each of the virtual image capture conditions (e.g., for each image capture device height and angle) based on the labelled virtual objects depicted in portions of the images. This can involve using the images for an image capture condition (e.g., a particular image capture device height and a particular image capture device angle) and the labelled objected depicted in respective portions of those images to determine each prior.

This collection of prior probability distributions can then be used with a computer vision machine learning (ML) model on new input images. The method can involve producing a probability distribution output associated with a computer vision task using a ML model on an input image associated with the particular image capture condition associated with that image. For example, given the image capture device height and image capture device angle, a corresponding prior can be selected and input (along with the input image) into a neural network trained to make predictions on input images based on the content of the image itself and the prior probability distribution. In other words, the neural network produces an output for a given input image and the prior corresponding the sensor data/image capture condition of that input image.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
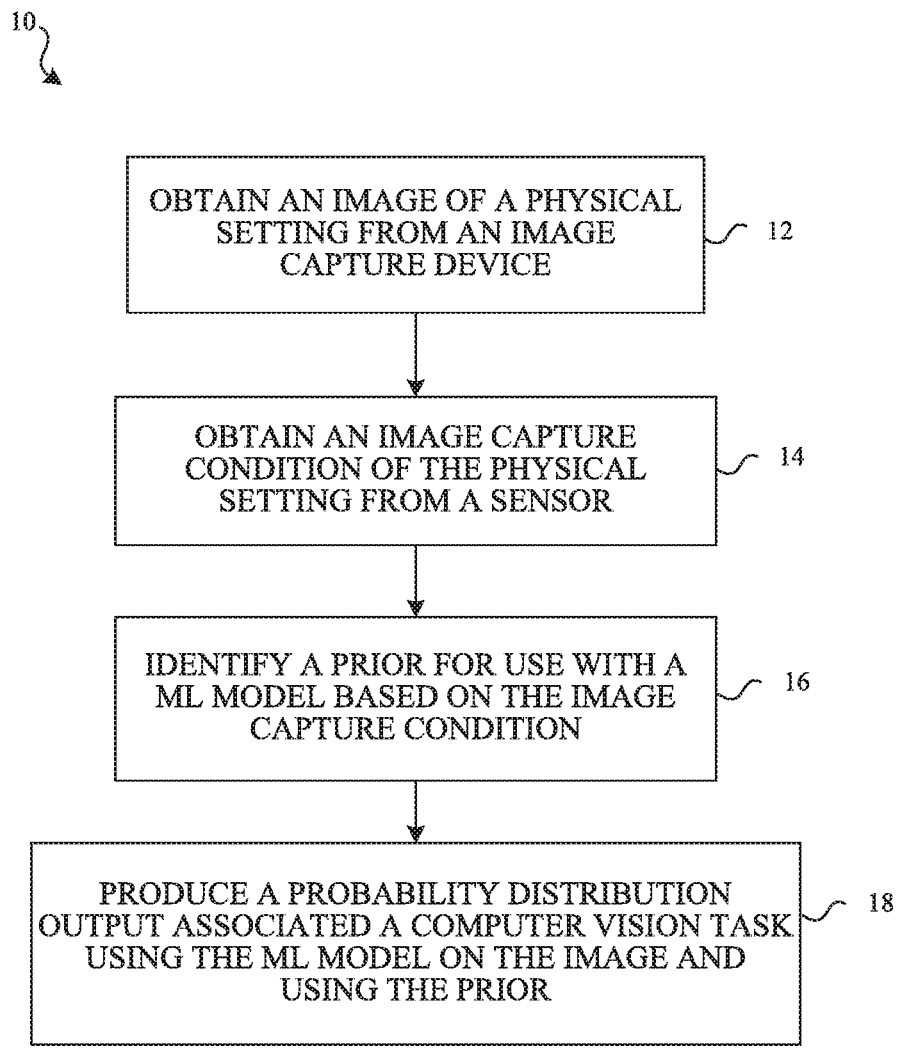
FIG. 1 is a flowchart representation of a method of performing a computer vision task for an image using a prior probability distribution selected based on an image capture condition determined from sensor data in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Using Prior Probability Distributions

FIG. 1 is a flowchart representation of a method 10 of performing a computer vision task for an image using a prior probability distribution selected based on an image capture condition determined from sensor data. In some implementations, the method 10 is performed by a device (e.g., device 800 of FIG. 8). The method 10 can be performed at a mobile device, head mounted device (HMD), desktop, laptop, or server device. In some implementations, the method 10 is performed by processing logic, including hardware, firmware, software, or a combination thereof. In some implementations, the method 10 is performed by a processor executing code stored in a non-transitory computer-readable medium (e.g., a memory).

At block 12, the method 10 obtains an image of a physical setting from an image capture device. In some implementations, the image is a live image captured by an image capture device (e.g., a camera) that is part of the device that is performing method 10. For example, a device, such as device 800 of FIG. 8, may receive images from one or more image capture devices (e.g., image sensor system(s) 814). In some implementations, the image capture device captures a sequence of images (e.g., video frames) some or all of which are to be rendered on a display (e.g., display(s) 812) of the device. The computer vision task (e.g., segmentation, depth estimation, normal direction estimation, etc.) may also be performed on some or all of the images of such a sequence of images.

At block 14, the method 10 obtains an image capture condition of the physical setting from a sensor. For example, sensor data from a sensor (e.g., I/O device(s) and sensor(s) 806 of FIG. 8) can be used to determine an image capture condition such as image capture device height, image capture device angle, geographic location, time, etc. In some implementations, at (or around) the instant an image is captured by an image capture device, sensor data is obtained from one or more sensors. The one or more sensors may include, but are not limited to: one-to-tri-axial accelerometers for measuring changes in velocity along one to three axes, one-to-tri-axial axis gyroscopes for measuring angular velocity about one to three axes, one-to-tri-axial magnetometers for measuring information regarding magnetic fields relative to one to three axes, a barometric pressure sensor for measuring atmospheric pressure, a clock, an ambient light sensor for measuring ambient light, and the like. In some implementations, sensor data is received from a separate device in the local scene or a remote location. For example, the method 10 may be performed by a mobile phone or head-mounted device (HMD) that receives sensor data from a watch the user is wearing or from a remote global positioning system (GPS) server.

At block 16, the method 10 further involves identifying a prior probability distribution for use with a machine learning (ML) model that produces probability distribution outputs associated with a computer vision task. The ML model can be, but is not limited to being, a deep neural network (DNN), an encoder/decoder neural network, a convolutional neural network (CNN), or a generative adversarial neural network (GANN). The prior probability distribution is identified based on the image capture condition of the image. For example, the prior probability distribution may be implemented as a function P having parameters height h and angle $\theta$ such that the prior $P(h, \theta)$ is specific to each image capture condition combination of h and $\theta$. The height h of the image capture device at the time of image capture may be determined relative to a reference plane such as a floor surface or a ceiling surface. The angle $\theta$ of the image capture device at the time of image capture may be determined relative to a reference direction such as a vertical direction (e.g., where "up" is determined based on sensor data).

A prior probability distribution for a particular image capture condition is a single probability distribution in some implementations. For example, such a prior probability distribution may indicate the probability of finding a chair anywhere (e.g., at any pixel) in the image given the height and angle of the image capture device. However, in some implementations, a prior probability distribution for a particular image capture condition includes multiple probability distributions. For example, there may be a first probability distribution for the top 100 rows of the image, a second probability distribution for the middle 100 rows of the image, and a third probability distribution for the bottom 100 rows of the image. In another example, there may be a probability distribution for each row of the image. These row-based groupings are based on recognizing that there is often symmetry across rows. That is, for example, given an image capture device height and angle from vertical, whether the user is capturing an image facing east, west, north, or south does not change the likelihood of capturing a couch in a given horizontal row. Thus, each pixel within a row of an image is equally likely to be a couch pixel. In these examples, a prior probability distribution could be a single column of probability distributions in which every row of the column provides information about a row of the image. Incorporating multiple prior probability distributions for different rows or other image portions enables the prior probability distribution for a given image capture condition to incorporate more detailed information. Doing so may improve the overall accuracy of the computer vision task that is ultimately performed using the prior probability distribution.

The computer vision task can include, but is not limited to, semantic segmentation, normal direction estimation, depth estimation, image-to-image translations, etc. For semantic segmentation, the prior may include a vector denoting probabilities that particular classes (e.g., chairs, tables, clocks, flowers, trees, walls, etc.) of a set of predefined classes are present in each portion/pixel of an image given the particular image capture condition. For normal direction estimation, the prior may include a vector denoting probabilities of surface normal values for each image portion/pixel given the image capture condition. For depth estimation, the prior may include a vector denoting probabilities of depth values for each image portion/pixel given the image capture condition.

At block 18, the method 10 produces a probability distribution output associated with the computer vision task using the ML model on the image and using the prior probability distribution. In a semantic segmentation example, the ML model produces an output image that predicts the likelihood that each pixel of the input image is a chair, table, wall, ceiling, etc., taking into account a prior probability distribution associated with the image capture device's current height and angle. In a normal direction estimation example, the ML model produces an output image that predicts surface normal values for image portions/pixels given the image capture condition. In a depth estimation example, the ML model produces an output image that predicts depth values for image portions/pixels given the image capture condition. The output image can include multiple probability distributions, e.g., per portion probability distributions, per column probability distributions, per pixel probability distributions, etc.

After producing a probability distribution output for the image, the method 10 can use this information to update the prior probability distribution. For example, after determining that the image does include a chair, the associated prior for that particular image condition (e.g., height and angle of the image capture device) can be updated to reflect this new information. In some implementations, prior probability distributions are constantly being updated as a sequence of images is processed. In some implementations, priors are created using universal training data prior to deployment to particular users and then the priors are updated using specific predictions made in the users' particular environments. In such implementations, the priors adapt over time to be customized/personalized to the particular user environments in which they are employed.

Figure 2:
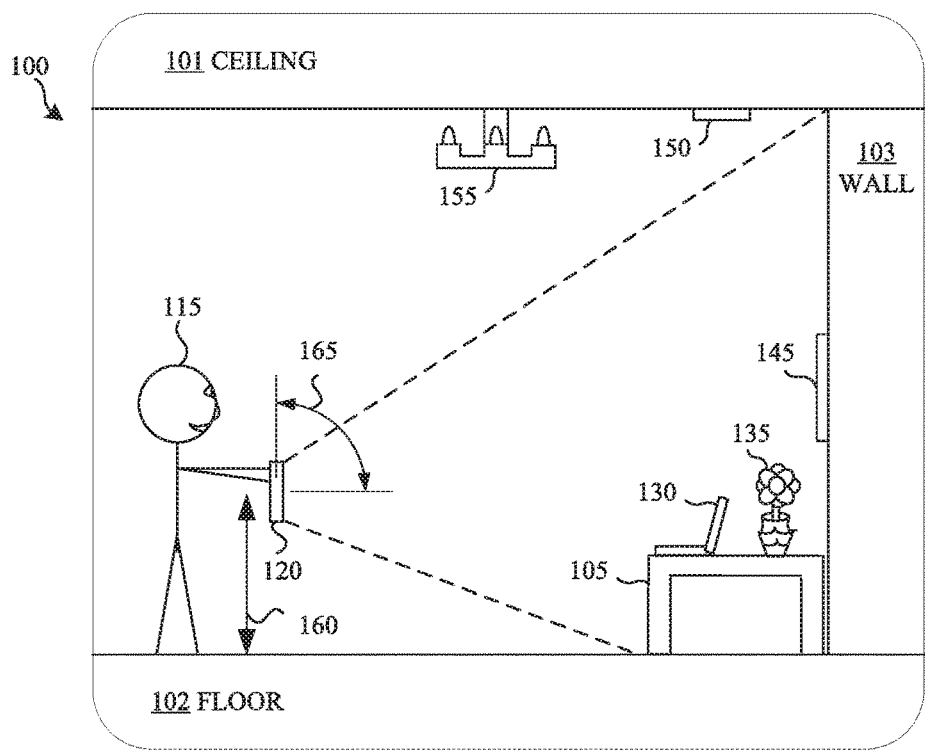
FIG. 2 is a block diagram illustrating a device capturing a first image of a scene under a first image capture condition.
Figure 3:
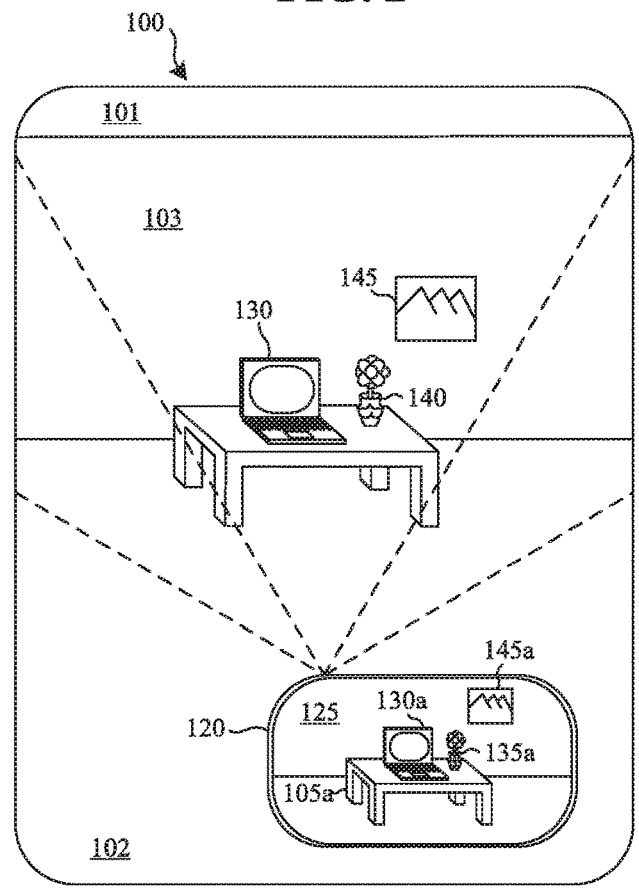
FIG. 3 is a block diagram illustrating another view of the device of FIG. 2 capturing the first image of the scene.

FIGS. 2-5 illustrate an exemplary scene 100 in which images can be captured and reasoned about using machine learning techniques that use image-capture condition-specific prior probability distributions. FIG. 2 is a block diagram illustrating a device 120 capturing a first image 125 (FIG. 3) of a scene 100 under a first image capture condition. In this example, the scene includes a ceiling 101, a floor 102, a wall 103, a table 105, a laptop 130, a vase with a flower 135, a wall painting 145, a smoke alarm 150, and a ceiling light fixture 155. The user 115 is depicted holding the device 120 and capturing an image of the scene 100. In this example, the image capture condition includes the height 160 of the device 120 above the floor 102 and angle 165 of the device 120 relative to a vertical direction. FIG. 3 is a block diagram illustrating another view of the device 120 capturing the first image 125 of the scene 100 under the image capture condition illustrated in FIG. 2. In this example, the first image 125 includes a table depiction 105a of table 105, a laptop depiction 130a of laptop 130, a vase with flower depiction 135a of the vase with the flower 135, and a wall painting depiction 145a of wall painting 145.

In an exemplary implementation, a prior probability distribution is determined for the image 125 based on the image capture condition, e.g., based on the height 160 and angle 165 of the device 120. For example, a prior probability distribution may be selected from a collection of image capture condition-specific priors stored on device 120 based on the image capture-condition. The selected prior probability distribution can then be used to facilitate the computer vision task on the image 125. For example, the image 125 and the selected prior probability distribution may be input or otherwise injected into a neural network or other machine learning model for a particular computer vision task (e.g., segmentation, normal estimation, depth estimation, etc.). In some implementations, the machine learning model includes multiple parts and the image is input into a first part of the model and the prior probability distribution is injected into a later part of the model.

Figure 4:
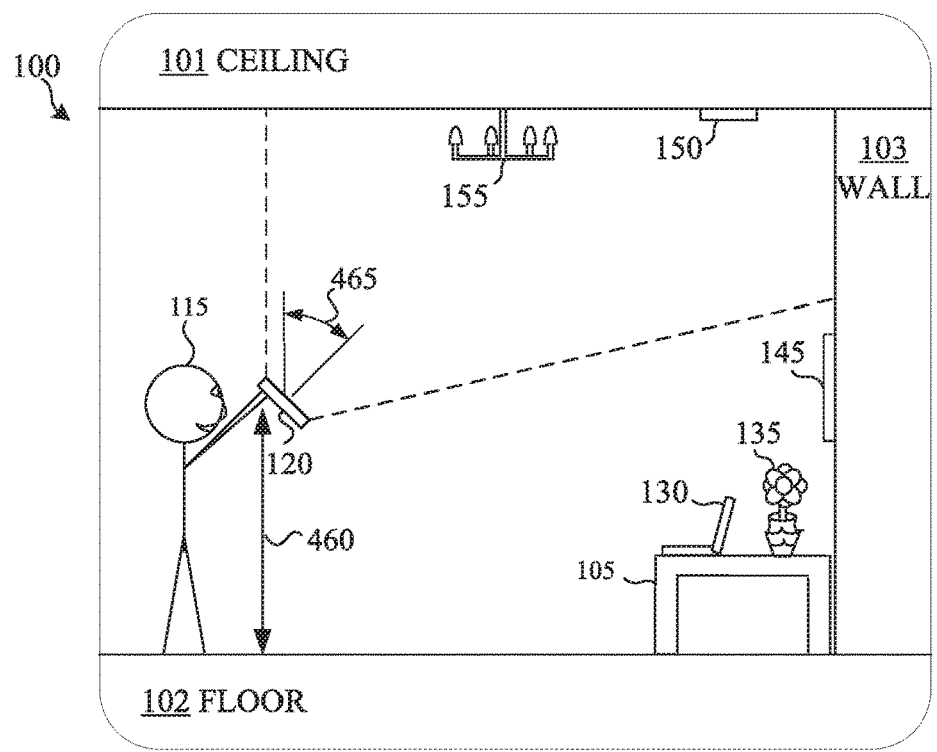
FIG. 4 is a block diagram illustrating the device of FIG. 2 capturing a second image of the scene under a second image capture condition.
Figure 5:
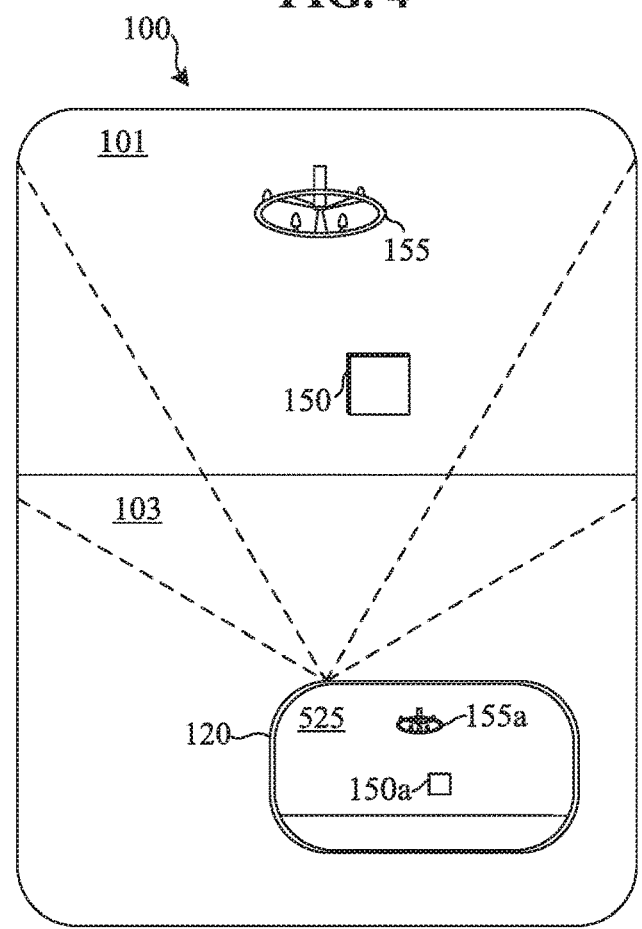
FIG. 5 is a block diagram illustrating another view of the device of FIG. 2 capturing the second image of the scene.

FIG. 4 is a block diagram illustrating the device 120 of FIG. 2 capturing a second image 525 (FIG. 5) of the scene 100 under a second image capture condition. The user 115 is depicted holding the device 120 and capturing the second image 525 of the scene 100. In this example, the image capture condition includes the height 460 of the device 120 above the floor 102 and angle 465 of the device 120 relative to a vertical direction. A comparison of FIGS. 2 and 4 reveals that the image capture condition of the first image 125 of FIG. 2 differs from the image capture condition of the second image 525 of FIG. 4. Specifically, the height 160 is less than the height 460 and the angle 165 is greater than the angle 465. FIG. 5 is a block diagram illustrating another view of the device 120 capturing the second image 525 of the scene 100 under the image capture condition illustrated in FIG. 4. In this example, the second image 525 includes a fire alarm depiction 150a of fire alarm 150 and a ceiling light fixture depiction 155a of ceiling light fixture 155.

In an exemplary implementation, a second prior probability distribution is determined for the second image 525 based on the second image capture condition, e.g., based on the height 460 and angle 465 of the device 120 when the second image 525 is captured. The second prior probability distribution can then be used to facilitate a computer vision task on the second image 525. For example, the second image 525 and the second prior probability distribution may be input or otherwise injected into neural network or other machine learning model for the particular computer vision task (e.g., segmentation, normal estimation, depth estimation, etc.).

The examples of FIGS. 2-4 illustrate how a computer vision task can be performed on the image 125 and the second image 525 using techniques that account for some prior expectations that are specific to the image capture condition of each image. The second prior probability distribution may, for example, reflect higher expectations (e.g., a higher probabilities) of observing a ceiling light fixture and smoke alarm because that prior was created or adjusted based on prior examples from real and virtual scenes in which ceiling fans and smoke alarms tended to be on the ceiling and not elsewhere. Accounting for these expectations by inputting/injecting the prior probability distributions into the machine learning models can accordingly make the models more accurate, efficient, or effective than otherwise.

Generating Prior Probability Distributions Using Synthetic Data

Figure 6:
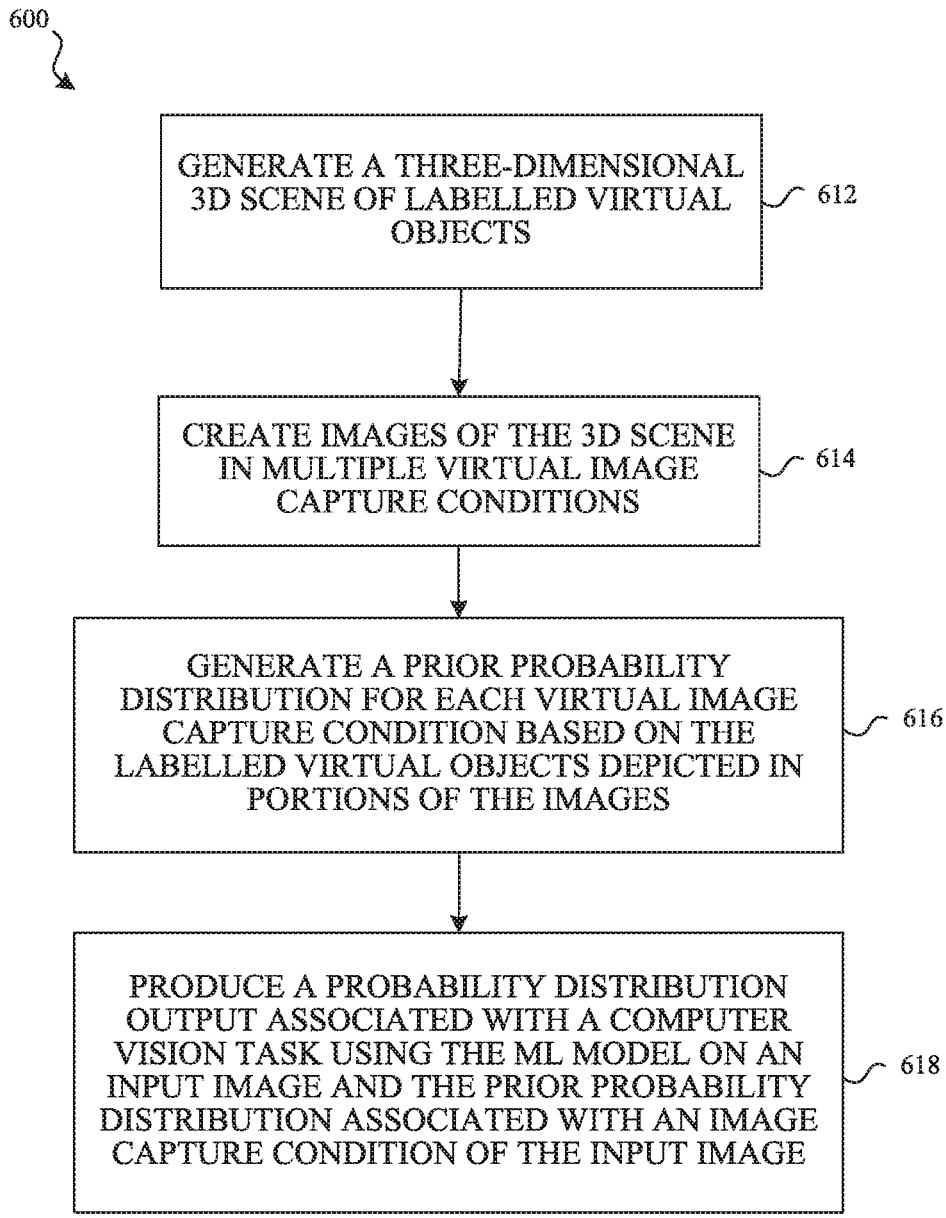
FIG. 6 is a flowchart representation of a method of learning prior probability distributions using synthetic data in accordance with some implementations.

FIG. 6 is a flowchart representation of a method 600 of learning prior probability distributions using synthetic data in accordance with some implementations. In some implementations, the method 600 is performed by a device (e.g., device 800 of FIG. 8). The method 600 can be performed at a mobile device, head mounted device (HMD), desktop, laptop, or server device. In some implementations, the method 600 is performed by processing logic, including hardware, firmware, software, or a combination thereof. In some implementations, the method 600 is performed by a processor executing code stored in a non-transitory computer-readable medium (e.g., a memory).

At block 612, the method 600 generates a three-dimensional (3D) scene comprising labelled virtual objects. The virtual objects can be automatically or manually labelled with the particular classes (e.g., chairs, tables, walls, etc.) of a set of predefined classes.

At block 614, the method 600 creates images of the 3D scene captured by a virtual image capture device in multiple virtual image capture conditions. For example, this can involve capturing images of the scene from multiple, different virtual image capture device heights and angles. The images can be captured from different positions in the scene. In some implementations, the images are collected from multiple labelled 3D scenes of virtual objects (e.g., a virtual family room, a virtual office, a virtual bedroom, etc.).

At block 616, the method 600 generates a prior probability distribution for each of the virtual image capture conditions (e.g., for each image capture device height and angle) based on the labelled virtual objects depicted in portions of the images. This can involve using the images for an image capture condition (e.g., a particular image capture device height and a particular image capture device angle) and the labelled objected depicted in respective portions those images to determine each prior. For example, if 100 images are generated at height 20 and angle 45 and 50 of those 100 images have a chair object depicted at pixel X and 0 of those 100 images have a chair object depicted at pixel Y, a semantic segmentation prior can be generated to reflect those probabilities (50/100 and 0/100) and probabilities for each of the other pixels to create a probability distribution for that prior. Similarly, a respective prior probability distribution can be generated for each of the other image capture device heights and angles. Priors for normal estimation and depth estimation can be similarly created from the known geometric properties/poses of the virtual objects.

After generating a prior probability distribution for each of the virtual image capture conditions, this collection of prior probability distributions can then be used with a computer vision machine learning (ML) model on new input images. Accordingly, for example, at block 618, the method 618 produces a probability distribution output associated with a computer vision task using a ML model on an input image associated with the particular image capture condition associated with that image. For example, given the image capture device height and image capture device angle associated with the input image, a corresponding prior can be selected and input (along with the input image) into a neural network trained to make predictions on input images based on the content of the image itself and a prior probability distribution. In other words, the neural network produces an output for a given input image and the prior corresponding the sensor data/image capture condition of that input image.

Training a Machine Learning Model to Consume Prior Probability Distributions

Figure 7:
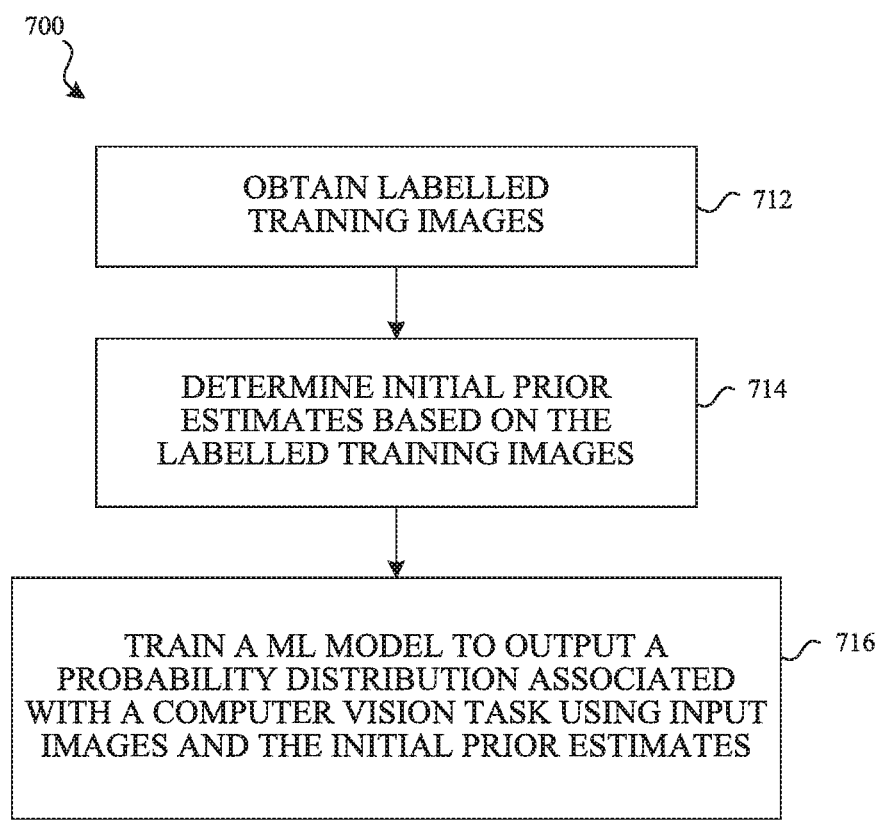
FIG. 7 is a flowchart representation of a method of training a machine learning model to consume priors in accordance with some implementations.

FIG. 7 is a flowchart representation of a method of training a machine learning model to consume priors in accordance with some implementations. In some implementations, the method 700 is performed by a device (e.g., device 800 of FIG. 8). The method 700 can be performed at a mobile device, head mounted device (HMD), desktop, laptop, or server device. In some implementations, the method 700 is performed by processing logic, including hardware, firmware, software, or a combination thereof. In some implementations, the method 700 is performed by a processor executing code stored in a non-transitory computer-readable medium (e.g., a memory).

At block 712, the method 700 obtains labeled training images. Such images may have been manually or automatically labelled with information corresponding to the results of a particular computer vision task. For example, for semantic segmentation, each portion of each image may be labelled with a particular class of object from a predetermined set of classes. Each of the labelled training images may be associated with a particular image capture condition, e.g., a particular height and angle of an image capture device. These labeled training images along with prior probability distributions associated with their image capture conditions will be used to train the machine learning model. However, prior probability distributions associated with particular image capture conditions may not be available.

Accordingly, as shown at block 714, the method 700 determines initial prior estimates to be used initially in training the machine learning model until more accurate prior probability distributions can be determined. At block 716, the method 700 trains the machine learning model to output a probability distribution associated with a computer vision task using input images and the initial prior estimates.

In some implementations, the initial prior probability distribution estimates are simply an average of all probabilities over all images regardless of image capture condition. Such a global prior probability distribution can be used as the initial prior probability distribution estimate for all image capture conditions to begin the training process.

In some implementations, an initial prior probability distribution estimate is a column vector of probabilities for particular pixel heights, e.g., the probability that a chair will be in the bottom row of pixels of any of the images regardless of its image capture condition, the probability that a chair will be in the second from the bottom row of pixels of any of the images regardless of its image capture condition, etc. Such a prior probability distribution can similarly be used as the initial prior probability distribution estimate for all image capture conditions to begin the training process. In some implementations, column vectors are computed over a relatively large corpus of labelled training images and are clustered to identify some indications of image capture conditions (e.g., heights, angles, etc.).

When actual prior probability distributions for particular image capture conditions become available, they can be used to adjust the ML model to ensure that it is configured to accurately consume the prior probability distributions.

Figure 8:
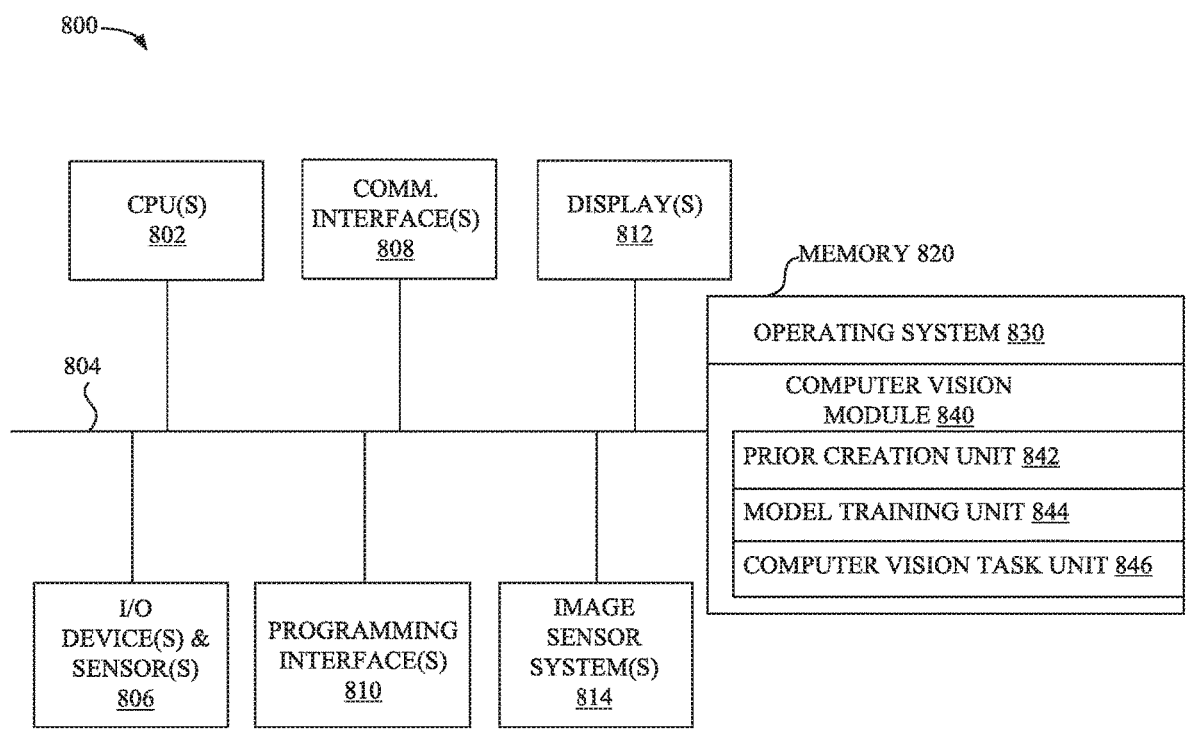
FIG. 8 is a block diagram of an example system architecture of an exemplary device in accordance with some implementations.

FIG. 8 is a block diagram of an example system architecture of an exemplary device configured to facilitate computer vision tasks in accordance with one or more implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units 802 (e.g., microprocessors, ASICs, FPGAs, GPUs, CPUs, processing cores, or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 810, one or more displays 812, one or more interior or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 812 are configured to present images from the image sensor system(s) 814. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 812 correspond to diffractive, reflective, polarized, holographic, etc. waveguide displays. For example, the device 800 includes a single display. In another example, the device 800 is a head-mounted device that includes a display for each eye of the user.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 comprises a non-transitory computer readable storage medium. In some implementations, the memory 820 or the non-transitory computer readable storage medium of the memory 820 stores the following programs, modules and data structures, or a subset thereof including an optional operating system 830 and a computer vision module 840.

The operating system 830 includes procedures for handling various basic system services and for performing hardware dependent tasks. In some implementations, the computer vision module 840 is configured to facilitate a computer vision task. The prior creation unit 842 is configured to create and edit prior probability distributions that will be used to facilitate the computer vision task, for example, using the method 600 of FIG. 6. The model training unit 844 is configured to train a machine learning model to perform the computer vision task, for example, using the method 700 of FIG. 7. The computer vision task unit 846 is configured to accomplish a computer vision task, for example, using the method 10 of FIG. 1. Although these modules and units are shown as residing on a single device (e.g., the device 800), it should be understood that in other implementations, any combination of the these modules and units may be located in separate computing devices.

Moreover, FIG. 8 is intended more as a functional description of the various features which are present in a particular implementation as opposed to a structural schematic of the implementations described herein. As recognized by those of ordinary skill in the art, items shown separately could be combined and some items could be separated. For example, some functional modules and units shown separately in FIG. 8 could be implemented in a single module or unit and the various functions of single functional blocks could be implemented by one or more functional blocks in various implementations. The actual number of modules and units and the division of particular functions and how features are allocated among them will vary from one implementation to another and, in some implementations, depends in part on the particular combination of hardware, software, or firmware chosen for a particular implementation.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the terms "or" and "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modifications may be implemented by those skilled in the art without departing from the scope and spirit of the invention.

What is claimed is:

1. A method, comprising:
   at an electronic device having a processor:
      obtaining an image of a physical setting from an image capture device;
      obtaining an image capture condition of the physical setting from a sensor, the image capture condition comprising a condition of the image capture device or physical setting occurring while the image capture device captures the image;
      identifying a prior probability distribution for use with a machine learning (ML) model that produces probability distribution outputs associated with a computer vision task, the prior probability distribution identified based on the image capture condition, the prior probability distribution comprising probabilities values for each of multiple image portions; and
      producing a probability distribution output associated with the computer vision task using the ML model on the image and using the prior probability distribution.

2. The method of claim 1, wherein the image capture condition comprises a height associated with a height of the image capture device while capturing the image.

3. The method of claim 1, wherein the image capture condition comprises an angle associated with an angle of the image capture device while capturing the image.

4. The method of claim 1, wherein the image capture condition comprises a geographic location or time associated with the image capture device while capturing the image.

5. The method of claim 1, wherein the computer vision task comprises semantic segmentation and the prior probability distribution comprises a vector denoting probabilities that particular classes of a set of predefined classes are present in each image portion given the image capture condition.

6. The method of claim 1, wherein the computer vision task comprises normal direction estimation and the prior probability distribution comprises a vector denoting probabilities of surface normal values for image portions given the image capture condition.

7. The method of claim 1, wherein the computer vision task comprises depth estimation and the prior probability distribution comprises a vector denoting probabilities of depth values for image portions given the image capture condition.

8. The method of claim 1, wherein the ML model produces output images comprising per pixel probability distributions.

9. The method of claim 1, further comprising updating the prior probability distribution for the image capture condition based on the probability distribution output.

10. The method of claim 1, wherein the prior probability distribution comprises a column of probability distributions in which every row of the column comprises probability information for one or more rows of image pixels.

11. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
obtaining an image of a physical setting from an image capture device;
obtaining an image capture condition of the physical setting from a sensor, the image capture condition comprising a condition of the image capture device or physical setting occurring while the image capture device captures the image;
identifying a prior probability distribution for use with a machine learning (ML) model that produces probability distribution outputs associated with a computer vision task, the prior probability distribution identified based on the image capture condition, the prior probability distribution comprising probabilities values for each of multiple image portions; and
producing a probability distribution output associated with the computer vision task using the ML model on the image and using the prior probability distribution.

12. The system of claim 11, wherein the image capture condition comprises a height associated with a height of the image capture device while capturing the image.

13. The system of claim 11, wherein the image capture condition comprises an angle associated with an angle of the image capture device while capturing the image.

14. The system of claim 11, wherein the image capture condition comprises a geographic location or time associated with the image capture device while capturing the image.

15. The system of claim 11, wherein the computer vision task comprises semantic segmentation and the prior probability distribution comprises a vector denoting probabilities that particular classes of a set of predefined classes are present in each image portion given the image capture condition.

* * * * *